Jan. 28, 1964 P. E. SLAVIN 3,119,987

SIGNAL CHANGE DETECTOR

Filed May 27, 1960 2 Sheets-Sheet 1

INVENTOR.
PETER E. SLAVIN

BY Edward M. Farrell

ATTORNEY

INVENTOR.
PETER E. SLAVIN
BY Edward M. Farrell
ATTORNEY

United States Patent Office 3,119,987
Patented Jan. 28, 1964

3,119,987
SIGNAL CHANGE DETECTOR

Peter E. Slavin, Philadelphia, Pa., assignor to Sperry Rand Corporation, New York, N.Y., a corporation of Delaware Filed May 27, 1960, Ser. No. 32,382
12 Claims. (Cl. 340—174.1)

This invention relates to a detector circuit, and more particularly to a detector circuit for detecting a change in a signal condition from a previously existing condition.

In many electrical systems, it is desirable to check a source of signals to determine if there has been a change from a previously existing condition. Such detector or comparator circuits are useful when a series of sequential operations are to be performed with the particular operations to be performed being determined by the previous operating states of certain circuits. For example, one operating state of circuit operation may indicate that one series of operations or steps should be followed while a different operating state of the same circuit may indicate that a different series of operations or steps should follow. Such detector or comparator circuits are particuarly applicable in the field of electronic computers which often involve various complicated programming operations.

A particular application for such detector circuits computors, for example, may involve addressing systems designed to select a particular address from a large number of addresses from a memory device, such as a magnetic drum. Very often, the actual selection operation involves a number of sequential steps or circuit operations. For example, the first step may involve a rough selection of a group of addresses from the total number of addresses in the magnetic drum. Subsequent operations or steps may then involve fine selection of the particular address from the group selected by the first or rough operation. In rough selection of an address on magnetic drum, for example, the first operation may involve the selection of a group of one hundred tracks, with a second operation involving the selection of a particular ten tracks from the first selected one hundred tracks. A third or final operation may involve the fine selection of a particular one of the ten tracks selected by the second operation. The first and second operations may be considered as rough selection while the third operation may be considered as fine selection of a particular address in a magnetic drum system which may involve a thousand or more addresses.

In most cases involving address selection, a new address normally involves both rough and fine selection operations. In magnetic drum address selection systems, various servo mechanisms and electrical circuits may be involved in lifting a magnetic head and moving it to a newly selected track to perform a reading or writing operation. If a new address or track differs from a previous address or track location only within the group of ten addresses or tracks, i.e. only the fine selection operation is involved, there is no need to perform the various operations relating to the rough selection, since the new address involves the same hundreds and group of ten tracks. Since considerable time can be saved by eliminating operations relating to rough selection when they are not needed, the new address may be compared with a previous address to determine if there has been a major change which would require the operation of the rough selection circuits or mechanisms. If there is no major change in address the rough selection operations may be eliminated, with only the operations relating to fine address selection being required. When servo mechanisms and other moving mechanical parts are involved in positioning a magnetic head during an addressing operation, considerable wear of mechanical parts may be avoided if unnecessary operations relating to rough positioning are eliminated.

It is an object of this invention to provide an electrical circuit for detecting a change in an electrical signal from a previously existing position.

It is a further object of this invention to provide a circuit for detecting a change in one or more of a series of electrical signals from a previously existing condition.

It is still a further object of this invention to provide an improved circuit for an addressing system in which mechanical movements of various parts are minimized in the absence of a major change of address from a previous address.

It is still a further object of this invention to provide an improved comparator circuit for an addressing system involving the positioning of a magnetic head over a magnetic drum storage device.

In accordance with the present invention, a circuit for detecting a change in an electrical signal at a signal source from a previously existing condition is provided. A bistable circuit has a first and a second stable state of operation. A signal from the signal source is applied to drive the bistable circuit into a first stable state of operation. A second signal source provides reset signals to drive the bistable circuit into its second stable state when a signal of one characteristic from the first signal source is applied to the bistable circuit. When a signal of a different characteristic is applied to the bistable network from the first signal source, the signal from the second source is ineffective to switch the operating state of said bistable circuit. An output circuit produces an output signal when the bistable circuit is switched from one stable state of operation to another. The circuit has particular application in addressing systems where rough and fine selective operations are to be performed.

Other objects and advantages of the present invention will be apparent and suggest themselves to those skilled in the art, from a reading of the following specification and claims in conjunction with the accompanying drawings, in which:

Figures 1, 2:
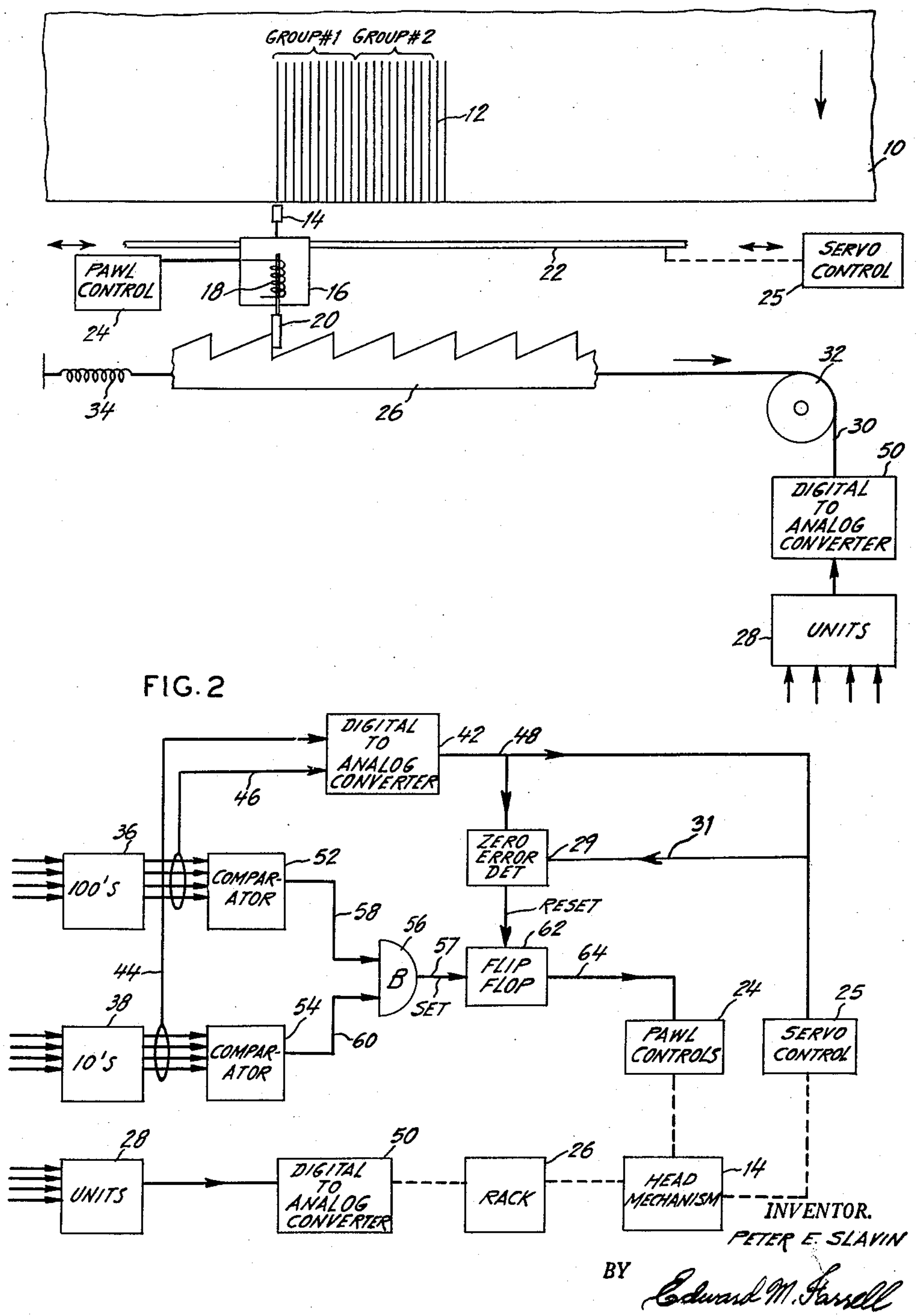
FIGURE 1 is a sketch illustrating an addressing system involving coarse and fine positioning of the magnetic head over a selected tract of a drum.
FIGURE 2 is a block diagram illustrating an addressing system utilizing a detector circuit, in accordance with the present invention.

Referring particularly to FIGURE 1, an embodiment involving precise positioning of a magnetic head over a selected track of a magnetic drum is illustrated. Magnetic drums which include a large number of information tracks are well known in the field of memory devices where quick random access to stored data is required. Normally the magnetic head is held in a raised position and transversely moved across the surface of a rotating magnetic drum by suitable means. When the head is disposed over a particular selected track it is lowered and made ready to commence a reading or writing operation.

Many magnetic drums include as many as 1000 or more data tracks which are generally crowded within a limited area. For purposes of explanation, in FIGURE 1, the data tracks are divided into groups, each containing ten data tracks designated Group 1, Group 2, etc. During operation, the magnetic head is first roughly positioned over a particular selected group before precise positioning of the head over a particular selected track takes place.

A magnetic drum 10 is rotated in the direction indicated by the arrow and includes a large number of data tracks 12 recorded thereon. A magnetic head 14 is carried by a carriage 16. The carriage member includes a solenoid 18 which is adapted to keep a pawl member 20 in a retracted position when the carriage 16 is carrying the head transversely across the surface of the drum during the rough or initial head positioning operation. The carriage 16 is driven by a belt 22 during the rough positioning operation with the movement of the belt 22 being caused by a servo control unit 25. Servo mechanisms including actuating motors may be incorporated into the servo control units 25 to drive the belt 22. Such mechanisms are well known to those skilled in the art and, therefore, details relating thereto are not shown for purposes of clarity. When the carriage member 16 is being moved during the rough positioning operation, the pawl member 20 is maintained in a retracted position until the magnetic head 14 is positioned over the group of ten tracks which include the particular one track to be selected on the magnetic drum 10.

In one embodiment, a coded electrical signal may be applied to the servo control unit 24 to cause the belt 22 to stop at the proper place to provide the rough positioning of the magnetic head 14 over a selected group of ten tracks. When the magnetic head 14 is roughly positioned over the selected group of ten tracks, such as Group 1, as illustrated, an electrical signal from the pawl control unit 24 which is normally applied to operate solenoid 18 is removed causing the solenoid to become deenergized to permit the pawl member 20 to fall within one of the teeth areas of a rack 26. In the embodiment illustrated, the distance between a pair of teeth of the rack 26 is equal in width to a group of 10 data tracks recorded on the magnetic drum 10.

After the movement of the carriage member 16 by the belt 22 is discontinued and the pawl member 20 is disposed to engage one of the teeth of the rack 26, the magnetic head 14 is ready for precise positioning. A coded signal is applied from a block 28 designated as "units" to a digital-to-analog converter 50, which provides an output mechanical motion linearly proportional to the input electrical coded signal. A strap 30 is connected between the converter 50 and a pulley wheel 32 to move the rack 26. The rack 26 is spring loaded by a spring 34 to normally maintain the rack at the neutral position when no output force is exerted on the rack by the strap 30.

It is noted from FIGURE 1 that the rough positioning of the magnetic head 14 is provided by the servo control unit 25, whereas the fine positioning of the magnetic head 14 is attained from a separate source, such as the digital-to-analog converter 50.

During normal operation of the system illustrated in FIGURE 1, assume that a new address, i.e. a new track on the drum, to be selected is within the same group of ten tracks as the previous address. If such is the case, it is not necessary that the servo control 25 involving rough selection operations to position the magnetic head 14 be operated. Only the fine selection operation involving movement of the rack 26 by a signal from the converter 50 need be performed to position the magnetic head 14 over the particular selected track within the group of ten tracks.

Referring particularly to FIGURE 2, an addressing system involving the present invention is illustrated. In considering this system, assume that the selection of an address, which may be a particular track on a drum, involves the use of three groups of binary coded signals, with each group including four signals. The binary signals may be represented by the presence of one of two types of characteristically different signals, that is a negative or a positive pulse signal or other difference in signal levels. In the embodiment to be described, the binary coded signal may represent a different in signal levels with one signal level representing a "1" condition and a different signal level representing a "0" condition. Conceivably, these signal levels may be indicated by the presence or absence of a pulse signal.

The first group of four binary coded signals is applied to a block 36 to be used to control the selection of a group of one hundred addresses, which may be tracks on a magnetic drum as previously indicated. The magnetic drum may include as many as one thousand or more information tracks.

The second group of four binary coded signals is applied to a block 38 to be used to control the selection of a group of ten tracks from the one hundred tracks initially selected by the first group of binary coded signals. The first two groups of binary coded signals are used to control the rough or coarse selection of an address.

A third group of four binary coded signals is applied to a block 40 to be used to control the selection of a particular track from the ten tracks selected by the second group of binary coded signals. The third group of signals controls the fine selection of an address. It is seen that the operations regarding the rough and fine address selections are separate and independent of each other.

When the address signal comprising twelve binary coded signals, divided into three groups of four signals each, are applied to the blocks 36, 38 and 40, designated "100's," "10's" and "Units," respectively, the magnetic head 14 is caused to be moved transversely across the surface of a drum while hunting a particular selected information track. The output signals from the blocks 36 and 38, which may be in the form of binary coded signals, are applied to digital-to-analog converter or decoder unit 42 through cables 44 and 46. The decoder unit 42 may be a form of digital-to-analog converter to produce an electrical signal at the output line 48 which is applied to the servo control unit 25. As more clearly seen in FIGURE 1, the mechanical output force from the servo control 25 causes the magnetic head 14 to be moved roughly over a selected group of ten tracks, the particular group selected being determined by the binary signal applied to the "100's" and "10's" blocks 36 and 38, respectively. When the magnetic head 14 is roughly positioned, the pawl control unit 24 causes the solenoid 18 to become deenergized and the pawl 20 drops within a selected area between two teeth of the rack 26.

An output signal from the "units" block 28, representing the third group of binary signals, is applied to the digital-to-analog converter 50. Such converters are capable of producing a mechanical output force linear and proportional to the sum of a plurality of input electrical signals and have been used in the past. One such form of converter which may be adapted for this purpose is illustrated in a patent issued to C. H. Henschel et al., 1,139,972, patented on May 18, 1950. The output mechanical force produced by the converter 50 is applied to cause the rack 26 to be moved. The rack 26 with one of its teeth engaging the pawl 20 is moved to precisely position the magnetic head 14 over the one selected track of the magnetic drum.

Let us first consider a situation in which the system involved has been in operation and that a new address is applied to select a new track on the drum and that the new address does not involve a major change in the positioning of the magnetic head 14. In this situation, the new address to be selected falls within the same group of ten tracks as the previous address and it is not necessary to actuate the servo and pawl control unit 24. Only the rack 26 need be moved to a new position.

The present invention may be related to systems and circuits for detecting a change in a condition of operation from a previously existing condition to determine what various subsequent operations are necessary. If the addressing system involving a magnetic drum, as in the system illustrated, requires no major change in address, the hundreds and tens binary coded signals will be the same as the previous signals. The servo control unit 24 will therefore remain unchanged, as will be described.

Figure 3:
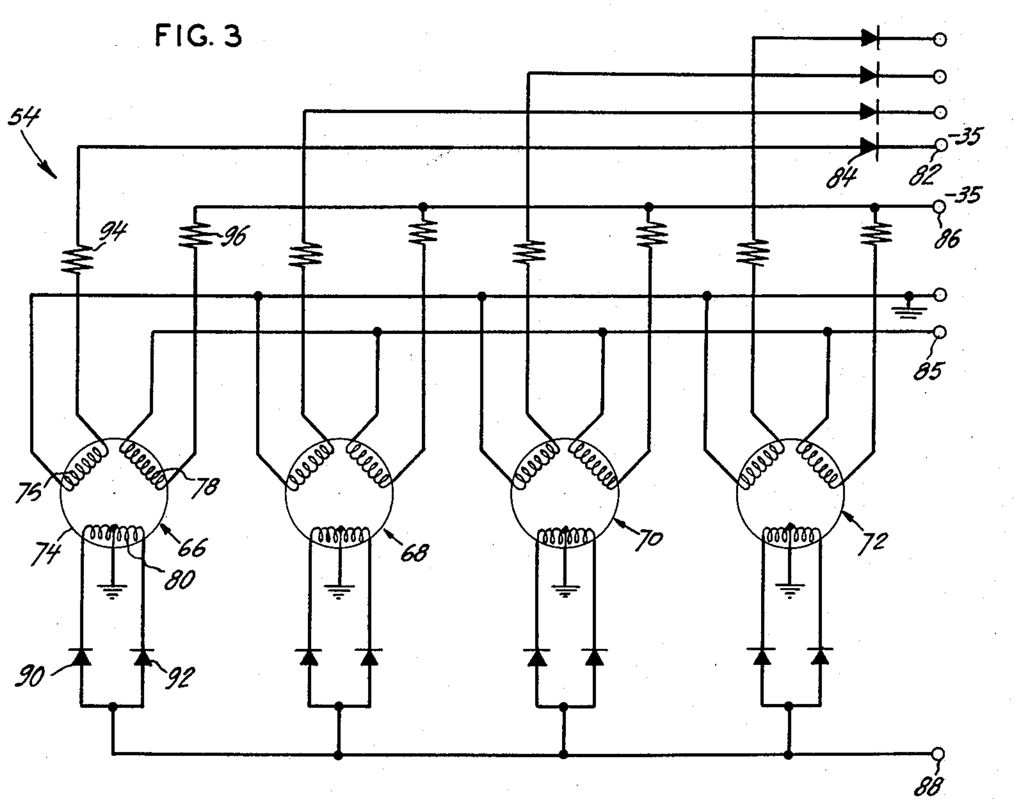
FIGURE 3 is a schematic diagram of a detector circuit in accordance with the present invention; and, FIGURE 4 is an idealized hysteresis loop for the core material used in the devices illustrated in FIGURE 3.

Output signals from the "100's" and "10's" blocks 36 and 38 are applied to a pair of comparators 52 and 54, respectively. The output signals from the comparators 52 and 54, which are still in a binary coded form, are applied to a buffer 56. A particular circuit used in the comparators 52 and 54 is illustrated in FIGURE 3 and will be described in detail hereinafter.

If a signal or series of signals applied to the comparator 52 are the same as the signal or series of signals previously applied thereto, no output signal will be developed at the output line 58. Likewise, if the signal or series of signals applied to the comparator 54 are the same as those previously applied thereto, no output signal will be developed at the output line 60. If no signals are applied to the buffer 56 from the lines 58 and 60, no output signal will be applied to flip-flop circuit 62 from the line 57. The voltage level at the line 64 determines whether the solenoid 18 (FIGURE 1) is energized or de-energized. In its de-energized condition the pawl 20 is down. When the solenoid 18 is energized, the pawl 20 is up. During the positioning operation, the voltage level at the line 64 is such that the pawl 20 is held up until the flip-flop 62 is reset by a signal from the zero detector circuit 29. A signal from the zero detector circuit 29 indicates that the head is roughly positioned and the flip-flop 62 is reset to cause the voltage level at the line 64 to change thereby causing the pawl 20 to drop into a selected tooth area.

If the signals applied to the comparators 52 and 54 are the same as those previously applied thereto, zero voltage will be applied to the servo control 25. The servo control unit 25 will therefore not be affected and no new rough positioning of the head will take place. The servo control 25 operates essentially on an error voltage resulting from a comparison of a voltage from the converter 42 and a source of reference voltage at the line representative of a rack position. The source of reference voltage may be included in the servo control 25. As the head comes into position, the error voltage gradually decreases towards zero. A zero error detector 29 is provided to detect a zero voltage condition between the voltage from the converter 42 and the reference voltage indicating that the head 14 is roughly positioned. Various closed circuits feedback arrangements for reduction of the error signal to zero may be employed. Such arrangements are not illustrated in detail for purposes of clarity and because the present invention is not specifically related thereto.

When there is a change in address relating to the fine positioning operation, the signals applied to the block 28 will be different from those previously applied thereto. The output voltage from the digital-to-analog converter 50 will be different from its previous output voltage to cause the rack 26 to be readjusted. Readjustment of the rack 26 causes the magnetic head 14 to be repositioned over a new selected track of the magnetic drum.

Let us now consider the operation of the system illustrated when there is a major change in address involved. In this case, there will be a change in the electrical signals involved in the hundreds or the tens track selection. If there is a change in any of the series of signals applied to the blocks 36 and 38 from a previously existing condition an output signal from one or both of the comparators 52 and 54 will result at the output lines 58 and/or 60, respectively. When a signal is applied to the buffer 56 from either or both of the output lines 58 and 60, a signal is developed at the output line 57 of the buffer and applied to the flip-flop 62. The signal applied to the flip-flop circuit sets the flip-flop and produces a change in voltage levels at the output line 64. The change in voltage level at the output line 64 is applied to the pawl control 24. The pawl control 24 is responsive to the change in voltage level to cause the solenoid 18 (FIGURE 1) to become de-energized to retract the pawl arm 20. With the pawl arm 20 retracted, the magnetic head 14 will seek a new rough position as determined by the voltage developed by the decoder unit 42 at the output line 48.

It may be seen from the previous discussion that the operations relating to addressing in a drum system involving rough and fine positioning of a magnetic head are separate and independent of each other. This makes it possible to minimize the amount of mechanical motion required of the head and various actuating mechanisms when only a fine positioning is required.

Referring particularly to FIGURE 3, a circuit which may be used as a comparator, such as the comparators 52 or 54 of FIGURE 2, is illustrated. Since both comparators 52 and 54 may be identical, the circuit of FIGURE 3 may be duplicated for both comparators.

As noted in FIGURE 2, the purpose of the comparator is to compare an address signal with a previous address signal and to detect a change in an electrical signal from a previously existing condition. As previously indicated, the address signal may comprise three groups of binary coded signals, four signals in each group. The binary signals may represent 0's or 1's, with the 1's being represented by the presence of a voltage of one level and the 0's being represented by a voltage of a different level. In order to detect the change in a "100's" or "10's" signal, for example a series of four signals capable of assuming different levels contained in an address signal may be compared with four signals in a previous address signal.

The comparator 54 comprises four saturable reactors 66, 68, 70 and 72. Since all these saturable reactors are substantially the same in operation, only the saturable reactor 66 and its associated elements will be described, it being understood that the other saturable reactors 68, 70 and 72 operate in substantially the same manner.

Figure 4:
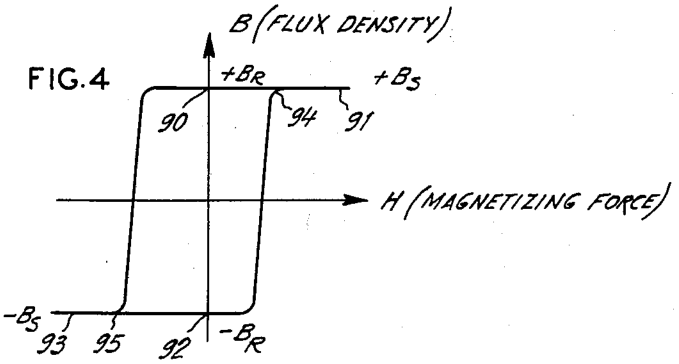

The saturable reactor 66 includes a core 74. The magnetic characteristic of the core 74 is such that its magnetization curve is as close as possible to a rectangular hysteresis loop. Such cores may be made of a variety of materials among which are the various types of ferrites. Such cores are capable of operation in two stable states and may be adapted to traverse its hysteresis loop and be switched from one stable saturation state to an opposite stable saturation state. FIGURE 4 illustrates an idealized hysteresis loop for such cores used in FIGURE 3. The cores illustrated may, of course, be constructed in a number of different geometries including both closed and open paths.

The core 74 is associated with an input winding 76, a reset winding 78 and an output winding 80. The output winding 80 is center tapped and returned to a point of reference potential designated as ground. The signal winding 76, in the embodiment illustrated, has twice the number of turns as the reset winding 78. Also, the signal winding 76 is wound in an opposite direction to the reset winding 78. Thus current through the signal winding 76 will have an opposite and substantially twice the magnetizing effect on the core 74 as a similar amount of current through the reset winding 78.

An address signal, which may be a binary signal representing a "0" or "1," is applied from an input terminal 82 through a diode 84 to the input winding 76 and returned to a common ground connection. In the embodiment illustrated, the "1" signal is represented by direct current voltage of −35 volts, for example, and the "0" signal is represented by the absence of a voltage signal. A source of voltage, which may also be −35 volts, is connected to an input terminal 86 to the reset winding 78. Reset pulses are applied to the reset winding 78 when the terminal 85, which is the common return for the reset windings, is periodically returned to zero volts from a normal voltage level of −35 volts.

In the absence of a voltage at the input terminal 82, indicative of a "0" signal condition, and the application of −35 v. pulse reset signal to the reset winding 78, the core 74 is driven into a stable state of saturation by the reset pulse. For purposes of illustration, this state of saturation may be considered as the negative state of saturation.

Assume now that the next signal applied to the input terminal 82 is also "0," that is, no change from the previously applied signal. When the second signal representing "0" is applied from the input terminal 82 to the input winding 76 and a reset pulse signal again applied to the reset winding, no change in the saturation state of the core takes place since the core is already in its negative region of saturation. With no change in the saturation state of the core 74, no output signal is developed at the output winding 80 since no signal is induced thereon by a changing magnetic field.

Assume now that a subsequent "1" signal is applied to the input winding 76 from the input terminal 82 after the first "0" signal. The "1" signal may be in the form of a −35 volt signal. As was previously noted, the input winding 76 has twice the number of turns as the reset winding 78 and is wound in an opposite direction to the winding 78. A −35 volt signal applied to the input winding 76 will therefore have a much greater and opposite effect upon the magnetization of the core 74 than does an equal signal voltage applied to the reset winding 78. The signal applied to the signal winding 76 is sufficient to overcome the effect of the reset signal to cause the core 74 to switch from one operating state to its opposite operating state. For purposes of explanation, this latter operating state of saturation may be considered as the positive saturation state. When a "0" signal is followed by a "1" signal at the input terminal 82, a signal denoting a change is induced in the output winding 80 due to the magnetic change in the operating state of the core.

Thus it may be seen that when a "0" signal is applied to the signal winding 76, the reset winding 78 will predominate and the core 74 will be in its negative saturation region. When a "1" signal is applied to the signal winding 78, it overcomes the effect of the signal applied to the reset winding 78 and the core 74 is driven to its positive saturation region.

Consider now a condition where the core 74 is at its positive saturation region as a result of the application of a "1" signal to the signal winding 76 and that a subsequent signal applied to the signal winding 76 is also a "1" signal. Since the core 74 is already at the positive saturation region as a result of the application of the previous "1" signal and the signal applied to the reset winding 76 is ineffective to switch the operating state of the core, no output signal will be developed across the output winding 80.

If a first signal applied to the signal winding 76 represents a "1" and the subsequent signal represents a "0," the signal applied to the reset winding 78 will be sufficient to switch the operating state of the core from its positive to its negative saturation region. The change in the magnetic flux in the core resulting from the change in operating states causes an output signal to be developed in the output winding 80. The signal produced denotes a change in a signal condition at the input terminal 80 from a previously existing signal condition.

It is thus seen that the saturable reactor 66 operates as a device to detect a change in signal condition at the signal winding 76 from a previously existing signal condition.

An output signal is developed at the output winding 80 whenever there is a change in the magnetic state of the core 74. All the output windings of the magnetic amplifiers or saturable reactors 66, 68, 70 and 72 are connected in parallel relationship with all the output windings being connected to an output terminal 88. When four signals, denoting a binary coded address signal, are applied to the saturable reactors 66, 68, 70 and 72 in the comparator 54, any change in any one of the signals from a previously existing condition will be detected and indicated by the development of a pulse signal at the output terminal 88.

A signal at the output terminal 88 indicates that there has been a major change in a new address from a previous address and that various servo and pawl control mechanisms, such as the servo control unit 25 and pawl control unit 24 (FIGURE 2), must be operated to position the magnetic head 14. In the absence of a signal at any of the output windings of the saturable reactors 66, 68, 70 and 72, no signal appears at the output terminal 88. The absence of a signal at the terminal 88 denotes that there is no major change in an address from a pervious address and that only the fine positioning circuits and mechanisms need be operated. These operations were described in connection with FIGURES 1 and 2.

The output signal from the center tapped winding 80 is applied to a pair of diodes 90 and 92 which are connected to the output terminal 88. The two diodes may be considered a buffer circuit which is employed so that a signal of the same polarity will be applied to the output terminal 88 regardless of the direction of change in the saturation states of the core 74. It is noted that the change in the core operating states may be from the positive to negative state or vice versa depending upon whether the input signal is changed from "1" or from "0" to "1." With the center tapped winding 80, and the diodes 90 and 92 connected as illustrated, an output signal of one polarity is produced.

Various resistors, such as a resistor 94 are inserted in the signal lines of the saturable reactors. Resistors, such as the resistor 96, are inserted in the reset lines of the saturable reactors. Both resistors provide current limiting. The values of these resistors are not critical and, in some cases, their use may not be necessary.

It has thus been seen that the present invention has provided a relatively simple bistable circuit for detecting changes in one or a series of signals from a previously existing condition. The use of such a circuit is particularly applicable to addressing systems when various functions are separate.

FIGURE 4 is an idealized hysteresis loop for the core material used in the devices of FIGURE 3. Referring to the hysteresis curve shown in FIGURE 4, it will be noted that the curve exhibits several significant points of operation, namely, point 90 ($+B_R$) which represents a point of plus remanence; the point 91 ($+B_S$) which represents plus saturation; the point 92 ($-B_R$) which represents minus remanence; the point 93 ($-B_S$) which represents minus saturation; the point 94 which represents the beginning of the plus saturation region; and the point 95 which represents the beginning of the minus saturation region.

In the present invention, a signal voltage of one characteristic, for example, a "1" signal, may be sufficient to drive a core into the plus region of saturation as represented by the point 91. A reset pulse voltage may be sufficient to drive the core into the minus region of saturation as represented by the point 93 if a "1" signal is not simultaneously applied. Since the presence of a "1" signal has a much greater effect than the reset signal, the core will remain at the plus region of saturation if two consecutive "1" signals are applied. When a "0" signal is applied to the core, the reset pulse signal is sufficient to drive it into the minus region of saturation.

The change in signal condition may be a change in voltage levels or may be the presence or absence of a pulse signal. It is recognized also that in employing a binary system "1's" may be represented by the absence of a signal voltage and "0's" by the presence of a signal voltage. The particular value of −35 volts and the particular way of producing the reset pulses were described by way of example.

It has been seen that the present invention has provided a relatively simple circuit for detecting signal changes. This circuit is especially adaptable for addressing systems involving positioning a head over a drum. The use of a circuit makes it possible to avoid the use of rough positioning circuits and mechanisms in the absence of a major change in address from a previous address.

The novel comparator circuit is of course not limited to addressing systems but may be included in various other systems where it is desired to detect a change in signal condition from a previously existing condition.

What is claimed is:

1. In combination with a first signal source for producing a series of signals having a first or second characteristic, means for detecting a change in the characteristic of two consecutive signals of said series of signals comprising a circuit having two states of operation, means for applying said series of signals from said signal source to said circuit, said circuit being driven into one state of operation when one of said series of signals is of said first characteristic, a second signal source for producing a series of periodically recurring signals capable of driving said circuit into its other state of operation in the absence of a simultaneously applied signal of said first characteristic from said first signals source, said signal from said second source being ineffective to change the operating state of said circuit in the presence of a simultaneously applied signal of said first characteristic from said first source, and an output circuit responsive to a change in operating states in said circuit to produce an output signal.

2. Means for detecting a change in two consecutive signals from a source of a series of signals from a first level to a second level comprising a circuit having two states of operation, means for applying said two consecutive signals to said circuit, a signal of said first level capable of driving said circuit into a first state of operation, a second signal source for producing a series of periodically recurring signals to drive said circuit into a second state of operation in the absence of a simultaneously applied signal of said first level from said source of a series of signals, said signals from said second source being ineffective to change the operating state of said circuit in the presence of a simultaneously applied signal of said first level from said source of series of signals, and an output circuit responsive to a change in operating states in said circuit to produce an output signal.

3. A circuit for detecting a change in an electrical signal at a signal source from a previously existing condition comprising a bistable circuit having a first and a second stable state of operation, said bistable circuit including a saturable reactor having input, output and reset windings associated with a core, said input winding having a substantially greater inductance than said reset winding, means for applying a binary signal from said source to said input winding of said bistable circuit, said binary signal being characterized by the presence of a first or second characteristically different type of signal, one said type of signal being capable of driving said bistable circuit into said first stable state, a second signal source, means for applying a signal from said second source to said reset winding of said bistable circuit, said signal from said second source being effective to drive said bistable circuit into said second stable state in the presence of said first type binary signal and being ineffective to control the operating state of said bistable circuit in the presence of said first type binary signal, and an output circuit including said output winding responsive to a change in operating states of said bistable circuit to produce an output signal.

4. A circuit for detecting a change in any one of a series of signals at a signal source from a previously existing condition comprising a plurality of bistable circuits each having a first and a second stable state of operation, means for applying said series of signals from said signal source to said bistable circuits, each of said series of signals being a first or second characteristically different type of signal, a signal of said first type being capable of driving an associated bistable circuit into said first stable state, a second source of signals, means for applying signals from said second source simultaneously to all of said bistable circuits, said signals from said second source being effective to drive one or more of said bistable circuits into said second stable state in the absence of said first type signal and being ineffective to change the operating state of any of said bistable circuits in the presence of said first type of signal, and an output circuit associated with said bistable circuits responsive to a change in operating states of any one of said bistable circuits to produce an output signal.

5. A circuit for detecting a change in any one of a series of signals at a signal source from a previously existing condition comprising a plurality of saturable reactors each having a first and second stable state of operation, means for applying one of said series of signals from said signal source to one of said saturable reactors, each of said series of signals being a first or second characteristically different type of signal, said signal of said first type being capable of driving an associated saturable reactor into said first stable state, a second source of periodic pulse signals, means for applying said pulse signals from said second source simultaneously to all of said saturable reactors, said pulse signals from said second source being effective to drive one or more of said saturable reactors into said first stable state in the presence of a signal of said second type and being ineffective to change the operating state of said saturable reactors in the presence of a signal of said first type, and an output circuit responsive to a change in operating states of any one of saturable reactors to produce an output signal.

6. In a magnetic drum system involving a plurality of tracks each having an address designated by a binary coded signal, a circuit for detecting a change in an address from a previous address comprising a plurality of bistable circuits including saturable reactors each having a first and a second stable state of operation, each of said saturable reactor circuits having input, output and reset windings with the inductance as said input windings being substantially greater than that of said reset windings, means for applying said binary coded signal to the input windings of said bistable circuits, said binary coded signal including a series of signals being of a first or second characteristically different type of signal, said binary signal of said first type being capable of driving an associated bistable circuit into said first stable state, a source of reset signals, means for applying said reset signals to the reset windings of all of said bistable circuits, said reset signals being effective to drive one or more of said bistable circuits into said second stable state in the absence of a binary signal of said first type and being ineffective to change the operating state of any of said bistable circuits in the presence of a binary signal of said first type, and an output circuit including said output windings associated with said bistable circuits responsive to a change in operating states of any one of said bistable circuits to produce an output signal thereby denoting a change in address from a previous address in said magnetic drum system.

7. In a magnetic drum system involving a plurality of information tracks having addresses designated by a binary coded signal characterized by a series of signals of a first or second level, a circuit for detecting a change in an address from a previous address comprising a plurality of saturable reactors each having a first and a second stable state of operation, each of said saturable reactors having input, output and reset windings with the inductance of said input windings being substantially greater than that of said reset windings, means for applying said binary coded signals to the input windings of said saturable reactors, said binary signal of said first level being capable of driving an associated saturable reactor into said first stable state, a source of periodic reset pulse signals, means for applying said reset signals to all the reset windings of said saturable reactors, said reset signals being effective to drive one or more of said saturable reactors into said second stable state in the presence of a binary signal of said second type and being ineffective to change the operating state of said saturable reactors in the presence of a binary signal of said first type, and an output circuit connected to the output windings responsive to a change in operating states of any one of saturable reactors to produce an output signal.

8. A circuit for detecting a change in any one of a series of signals at a signal source from a previously existing condition comprising a plurality of saturable reactors each having a core element adapted to be driven to a first and a second stable state of operation, each of said saturable reactors having input, output and reset windings, said input winding having a substantially higher inductance than said reset winding, means for applying one of said series of signals from said signal source to the input winding of one of said saturable reactors, each of said signals being a first or second characteristically different type of signal, said first type of signal being capable of driving an associated saturable reactor into said first stable state, a second source of periodic reset pulse signals, means for applying said reset pulse signals from said second source to the reset windings of all of said saturable reactors, said reset pulse signals from said second source being effective to drive one or more of said saturable reactors into said second stable state in the presence of a signal of said second type and being ineffective to change the operating state of said saturable reactors in the presence of signal of said first type, means for connecting the output windings of said saturable reactors in parallel relationship, said output windings being responsive to a change in operating states of any one of saturable reactors to produce an output signal.

9. A circuit as set forth in claim 8 wherein said reset windings are connected in parallel relationship with respect to each other.

10. A circuit as set forth in claim 9 wherein said series of signals comprises a binary coded signal in an addressing system involving a magnetic drum.

11. A circuit as set forth in claim 10 wherein a fine positioning mechanism in a magnetic head positioning system is actuated when an output signal is produced at said output windings.

12. A circuit as set forth in claim 11 wherein said fine positioning mechanism includes a rack assembly having tooth spacings corresponding to a predetermined number of information tracks on a magnetic drum.

References Cited in the file of this patent

UNITED STATES PATENTS

| | | |
|---|---|---|
| 2,753,545 | Lund | July 3, 1956 |
| 2,896,130 | Tomkins | July 21, 1959 |
| 2,909,673 | Gunderson | Oct. 20, 1959 |